Sept. 10, 1940.　　　D. W. NORWOOD　　　2,214,283
EXPOSURE METER
Filed Nov. 14, 1938
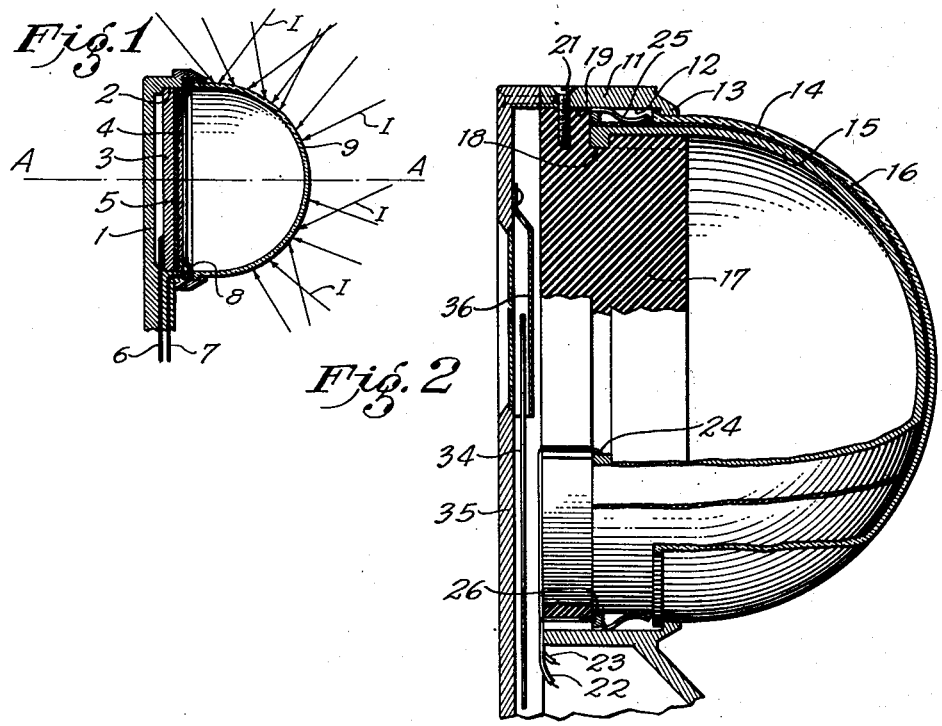
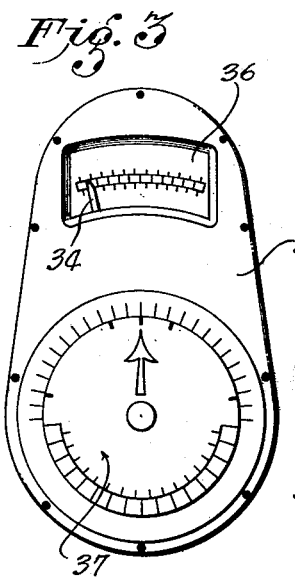
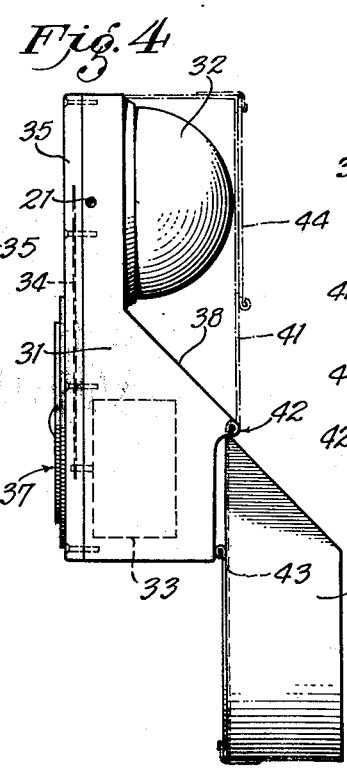
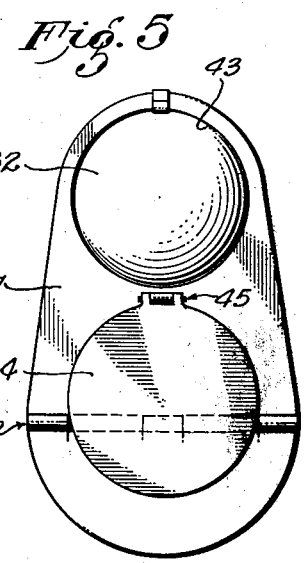
DONALD W. NORWOOD,
INVENTOR.
By Arthur P. Knight
and Alfred W. Knight
ATTORNEYS.

Patented Sept. 10, 1940

2,214,283

UNITED STATES PATENT OFFICE 2,214,283

EXPOSURE METER

Donald W. Norwood, Denver, Colo.

Application November 14, 1938, Serial No. 240,297

6 Claims. (Cl. 88—23)

This invention relates to a device for use in determining the optimum exposure of a photographic subject, and pertains more particularly to a device whose operation is based upon the measurement of light which is incident upon the subject rather than reflected therefrom.

One of the particular objects of the invention is to provide an exposure meter which is substantially uniformly responsive to light incident upon the photographic subject from practically all directions which would result in the reflection of light to the camera or other photographic register.

A further object of the invention is to provide an exposure meter adapted to indicate the correct exposure of a given photographic subject independent of the intrinsic reflection power of the subject itself.

A further object of the invention is to provide a device of the character described, which is alternatively useful in the measurement of light intensity incident upon the subject and reflected therefrom.

The device of the present invention is particularly useful in the determination of exposure in connection with the production of natural color photographs, and while the advantages of the device are also to be realized in the production of the conventional black and white photographic registers, the principle of operation of the device makes it particularly useful for natural color photography in view of the fact that the results obtained by the use of the device are based upon the effective illuminating power of the light source rather than upon intrinsic reflecting power of various portions of or an average of the photographic subject. The so-called "photronic" cells have been found useful in photographic exposure determination, and have in general been used for measuring the light reflected from the photographic subject. More particularly they have been used in devices designed to measure light coming from a solid angle comparable to the angle subtended by the camera lens so as to exclude the light coming from positions removed from the field of view of the camera. These devices actually measure the arithmetic sums of the light reflected from or emitted by the components of the photographic subject, and on the theory that the average photographic subject is composed of about equal parts of light and dark areas, the desired center of the geometric scale of brightness of the subject is determined by reference to a calculator dial in which the pointer is disposed at a position offset from the arithmetic midpoint so as to give an approximation of this geometric midpoint. This arbitrary offset is necessarily adequate within but a narrow range of total illumination intensity, which establishes an inherent defect in this reflection type of apparatus. Since the total illumination received by the reflection type of instrument is primarily affected by the relative quantities of light and dark areas in a scene, when these light and dark areas depart from an equal proportion balance (on which the instrument is fundamentally based) the effect may be so pronounced that the exposure value determined from the received reflected illumination may differ considerably from the exposure value which would be proper for the particular subject.

According to the present invention, means are provided for observing and indicating the illuminating value of the effective light falling upon the subject from a light source or sources, whereby computation of the exposure may be based on the effective illumination of the photographic subject, rather than on the quantity of light emitted (as by reflection) from the subject itself. The device of the present invention comprises, essentially, a light-responsive element of extended area adapted to receive light from substantially the same directions as light is received by the photographic subject itself, with reference to the axis along which the photographic exposure is to be made, and such element more particularly comprises one adapted to respond to light normally incident thereon within a solid angle not materially less than $2\pi$ steradians and to light incident thereon at angles other than normal within a solid angle including but greater than the first-named solid angle.

The exposure-meter device of the present invention is adapted to provide a much more accurate estimation of the correct exposure for a photographic subject by virtue of the measurement of the effective illumination obtaining at the position of the subject. Photographic subjects are for the most part made up of three-dimensioned objects defined by plane or curved surfaces of varied reflecting power. Light may be shining upon these surfaces from almost any direction and at almost any intensity. The measurement of light reflected or emitted by the subject surfaces results only in an indication of average illuminating value of the subject as a whole, rather than the condition of illumination of the subject. The following example is given for the purpose of illustrating the variation of effective illumination of a subject: Consider a sphere as a representative photographic subject (inasmuch as any three-dimensioned subject may be considered to have surfaces, the counterpart of which may be found on the surface of a sphere); if this sphere were to be illuminated solely by light falling along the photographic axis, from the position of the camera, the entire hemisphere viewed by the camera would be illuminated. If the light were shifted so that the light:subject axis would extend at 45° (for example) to the camera:subject axis but with the light still on the "camera" side of the sphere, the sphere would be illuminated much as a three-quarters full moon; if the light were further shifted so that the light:subject axis would be normal to the camera:subject axis, the sphere would be illuminated much as a half moon, and so on. If the light were then moved to the rearward side of the sphere, with respect to the camera, the illuminated cresent on the sphere would gradually decrease in area and intensity until the light source was located along a projection of the camera:subject axis, at which time the effective illumination of the sphere (as far as the camera is concerned) would be zero.

If one were to substitute a hemisphere for the above-mentioned sphere, and actually measure the quantity of light received by that hemisphere, one would thus closely approximate, by direct measurement, the quantity of effective light received by the photographic subject.

This result is accomplished by the present invention by providing a photo-responsive surface simulating a photographic subject in shape, and disposed in the same light-receiving relation with respect to the camera and the light source or sources as is the photographic subject itself. In its preferred embodiment the device is hemispherical in shape, although the practical equivalence of convexly shaped devices having comparable angular response will be apparent to those skilled in the art.

The accompanying drawing illustrates certain preferred embodiments of my exposure meter, and referring thereto:

Figs. 1 and 2 are sectional views illustrating the construction of two types of light-responsive elements according to the present invention, Fig. 2 being on a somewhat larger scale than Fig. 1;

Fig. 3 is a front view of a specific embodiment of the invention;

Fig. 4 is a side view of the embodiment illustrated in Fig. 3; and

Fig. 5 is a rearward view of the device in folded condition.

Referring to Fig. 1, the exposure meter of this invention is shown as comprising a base portion 1 provided with a recess 2 carrying a photosensitive structure which, for purposes of simplicity, is illustrated as of the conventional "photo-voltaic" type, i. e., a type which acts as a variable source of electrical energy, as opposed to the "photoelectric" cell which requires an external source of electrical energy and may be considered as a variable resistor of electrical energy. It will be apparent that as far as the teachings of the present invention are concerned, cells of either type are contemplated, and equally adapted to use according to this invention, although the present description is concerned primarily with the photo-voltaic type due to the fact that no outside source of energy is required and the constructions are simplified to this extent; those skilled in the art will appreciate the technical equivalence of these two types of photo-responsive elements, and the expression "photo-responsive element" as used hereinafter will be interpreted as including both types of devices.

The light-sensitive element may comprise a back layer 3 of conducting metal, for example, provided with a photo-sensitive layer 4 such as of selenium or cuprous oxide, which is in turn provided with a semi-transparent electrically conductive layer 5, such as a sputtered layer of gold or other suitable metal; electrical connectors are provided as at 6 and 7, respectively connected to the base 3 and a contact ring 8 which bears on the peripheral portions of the conductive layer 5. In order to secure effective observation or measurement of light falling upon the device through a solid angle materially greater than $2\pi$ steradians, I provide, in this particular form of invention, a translucent light-receiving member 9 disposed outwardly of the photosensitive element, and of convex surface configuration. The light-receiving element 9 is shown as substantially hemispherical in shape, whereby the normals to the various portions of its light-receiving outer surface all lie within and are distributed over a solid angle of substantially $2\pi$ steradians. Convex surfaces which depart from true hemispherical shape, such as ovate or ellipsoidal surfaces, will also be useful.

The connectors 6 and 7 will be connected to a suitable form of microammeter or the like adapted to provide a visible indication of the amount of light to which the photosensitive element is exposed, and the device may be used substantially as follows:

Having selected a particular photographic subject and determined upon the photographic axis along which the camera is to be directed to secure the desired image, the device of the present invention is placed substantially along this axis, as indicated at A—A in Fig. 1, with the light-receiving surface of element 9 pointed toward the camera position. The surface of the translucent member 9 receives and is responsive to substantially all light which is available for illumination of the subject, that is, all the light which will fall upon the subject at such positions and in such directions as to produce reflected light directed toward the camera position, and is thus positioned comparably to the photographic subject with respect to the location of both the camera and the light source or sources.

It will be apparent that the entire surface area of translucent element 9 is in the path of light directed upon the device, from the side toward the camera, in directions parallel to the axis A—A, and light so received (which is the most effective for illumination of the subject for photographic purposes) will therefore produce a maximum effect on the photosensitive surface. Light directed upon the device in directions at progressively greater angles from the axis A—A will be received upon progressively smaller portions of the surface area of element 9, and the effect thereof upon the photosensitive surface will therefore decrease progressively, as does the effectiveness of such light in illuminating the subject for photographic purposes. The device is thus partially responsive to light received from directions at 90° to the axis A—A. It is also responsive to light directed thereon from the side away from the camera position and at an angle to the axis A—A, but the degree of response to such light continues to decrease until the direction of the light becomes such that it no longer strikes the surface of element 9, due to its hemispherical shape and also to the shielding effect of the mounting assembly, and it will be evident that such light to which the device is non-responsive will also be substantially ineffective for illuminating the subject when viewed from the camera position.

It will be seen from the above that the convex light-receiving surface of the translucent element 9 is of such shape and configuration as to receive light directed upon it over a solid angle greater than $2\pi$ steradians but less than $4\pi$ steradians. Furthermore, it will be seen that the device is substantially responsive to light from all directions which is effective for illumination of the subject when viewed from the camera position, and that the indications obtained are such as to quite accurately take into account the relative illuminating values of light received from different directions.

The above-mentioned numerous directions of incident light are indicated by the numerous arrows I, and the translucent light-receiving element 9 serves to integrate this total illumination. The photosensitive element is exposed to the light transmitted by the translucent element 9, giving a light intensity indication which approximates (within photographic requirements) the effective illumination falling upon the photographic subject. For exterior use, assuming the available illumination results from sunlight and/or skylight, the device may be placed at substantially any location along the photographic axis, but where one or more localized light sources are employed at positions relatively close to the subject, as in interior photography with the use of "spots" or "Photoflood" lamps, or in any case where the intensity of illumination is not uniform at different positions along the photographic axis and where the subject of primary photographic interest is located at a fairly definite position which is readily accessible to the photographer, the device will preferably be placed close to the position of the photographic subject or main point of interest therein and directed along the photographic axis as above described. The arrows I in Fig. 1 obviously represent merely that light which is received in the plane in which the sectional view is taken, but it will be appreciated that the same result is had from light falling on the surface of element 9 in other planes.

The form of device shown in Fig. 2 comprises a modified form of light-responsive element, in which the light-sensitive surface corresponding to the layer 4 in Fig. 1 is disposed in convex fashion so as to be responsive to light incident thereon through an angle greater than $2\pi$ steradians, and referring more particularly thereto, the device may comprise a housing 11 provided with a recess 12 having a rim portion 13, within which the photosensitive element is disposed, which element may comprise an outer light-receiving and light-transmitting element 14 of glass, Celluloid, or similar translucent or transparent material formed into convex shape such as hemispherical, within which is disposed a correspondingly shaped shell 15 comparable in function to the base 3 above and carrying a photosensitive layer 16 corresponding to the layers 4 and 5 of Fig. 1 and responsive to light received by the outer convex surface of element 14. The shell 15 is secured in position within the housing 11 in any suitable manner as through the agency of a nonconductive plug 17 secured to the shell 15 as through the agency of a bayonet locking device 18, and having a portion fitting closely within the recess 12 as at 19, the plug being secured in position within the housing through the agency of a plurality of screws or the like 21.

Electrical connection to the shell 15 and the outer portion of photosensitive layer 16 is provided by means of connectors 22 and 23 respectively connected electrically to the shell 15 as at 24 and to the surface 16 through the agency of the contact ring and contact fingers 25, as at 26.

The form of device illustrated in Fig. 2 is employed for the estimation of exposure in a manner and with results comparable to those described in connection with the form of device shown in Fig. 1.

Figs. 3 through 5 illustrate a suitable housing structure within which a photosensitive element and its associated microammeter may be mounted. A main housing is indicated at 31 (corresponding to the housing indicated at 11 in Fig. 2) within which a photo-responsive structure is maintained, as at 32, which may be of either of the two types illustrated in Figs. 1 and 2. The housing 31 is provided with a suitable recess at a point removed from the element 32, within which a suitable microammeter 33 may be disposed as indicated in dotted lines. The indicating needle 34 for the microammeter 33 may be extended along the forward side of the housing, and a suitable apertured cover 35 may be provided for the forward side of said housing. A suitable dial will be provided rearwardly of the needle 34 and forwardly of base portion 17 of the photo-responsive element, as at 36, according to conventional practice. Similarly, a suitable calculator dial or comparable device may be provided at 37 exteriorly of the housing 31, as on the cover 35, to facilitate exposure calculations for specific emulsion speeds and at specific "f" openings from a given indication of the needle 34.

In order to expose the element 32 to the optimum amount of light received from directions corresponding to those in which the photographic subject receives effective illuminating light, the rearward portion of the housing 31 may be tapered downwardly and away from the element 32 as at 38, although as a substitute for this expedient I may construct the housing 31 in such fashion that the portion thereof which receives the microammeter or the like is disposed forwardly of the base of the element 32, as will be apparent to one skilled in the art. A suitable cover 41 having enclosing side and forward wall portions may be provided which may be moved into position to completely cover the element 32 as shown in dot-dash lines in Fig. 4 or to a position exposing said element for use as shown in full lines in Fig. 4, such cover being conveniently hinged to the housing 31 as at 42 and movable between the indicated positions.

In order that the device of the present invention may be employed in the role of a conventional exposure meter, i. e., so that it may be used to measure the light emitted from the photographic subject, I may provide an aperture 43 in the forward wall portion of the cover 41, as shown in Figs. 4 and 5, so located that it will fall substantially symmetrically opposite the element 32 when the cover is in closed position, the plane of the aperture being located forwardly of the face of the member 32, and the aperture being of approximately the same diameter as that of the element 32, so that when the cover 41 is in closed position and aperture 43 is exposed the angle of light incident upon the element 32 will be materially restricted to a value less than π steradians. A suitable movable cover 44 may be provided for the aperture 43, hingedly mounted to the cover 41 as at 45.

Other modifications of the device will occur to those skilled in the art, and I do not choose to be limited to the specific embodiments herein delineated and described, but rather to the scope of the subjoined claims. For example, the light-receiving and/or light-responsive surfaces may be given a convexity which departs materially from the delineated hemispherical surfaces. Furthermore, the surfaces do not necessarily conform to true surfaces of revolution, inasmuch as polyhedral surfaces approximating the desired convexity will be equivalent. These surfaces are therefore defined in the claims as comprising a plurality of surface portions disposed in substantially contiguous relation and arranged to define a surface of convex configuration, it being apparent that a continuous curved surface, such as a hemisphere, can be considered as made up of an infinite number of surface portions each of infinitesimal area.

I claim:

1. An exposure meter which comprises: a translucent light-receiving element having a light-receiving surface of extended area, said surface being composed of a plurality of substantially contiguous surface portions arranged in convex surface configuration and so disposed that the normals thereto lie within and are distributed over a solid angle of substantially 2π steradians; a light-responsive element disposed rearwardly of said light-receiving element and responsive to the diffused light transmitted thereto by said light-receiving element; and indicating means associated with the said light-responsive element for producing a visible indication of the quantity of light received by said light-receiving surface.

2. An exposure meter which comprises: a translucent and diffusing light-receiving element having a light-receiving surface of extended area, said surface being composed of a plurality of substantially contiguous surface portions arranged in convex surface configuration and so disposed that the normals thereto lie within and are distributed over a solid angle of substantially 2π steradians; a light-responsive a light-responsive element disposed rearwardly of and spaced from said translucent light-receiving element and responsive to the diffused light transmitted thereto by said light-receiving element, and indicating means associated with said light-responsive element for producing a visible indication of the quantity of light received by said light-receiving surface.

3. An exposure meter which comprises: translucent and diffusing light-receiving element having a light-receiving surface of extended area, said surface being composed of a plurality of substantially contiguous surface portions arranged in convex surface configuration conforming wholly to a substantially hemispherical surface and of such shape as to receive light directed toward it over a solid angle materially greater than 2π steradians but less than 4π steradians; a light-responsive element associated with said light-receiving surface and responsive to the diffused light transmitted thereto by said light-receiving element and resulting from light incident upon said surface from all directions within said solid angle; and indicating means associated with said light-responsive element for producing a visible indication of the quantity of light received by said light-receiving surface.

4. An exposure meter which comprises: a translucent and diffusing light-receiving element having a light-receiving surface of extended area, said surface being composed of a plurality of substantially contiguous surface portions arranged in convex surface configuration conforming wholly to a substantially hemispherical surface and so shaped as to receive light directed toward it over a solid angle materially greater than 2π steradians but less than 4π steradians; a light-responsive element disposed rearwardly of and spaced from said translucent light-receiving element and responsive to the diffused light transmitted thereto by said light-receiving element, and indicating means associated with said light-responsive element for producing a visible indication of the quantity of light received by said light-receiving surface.

5. An exposure meter which comprises: a housing; a convex light-receiving and light-transmitting element mounted on said housing and projecting therefrom, said element being of such configuration as to receive and transmit inwardly thereof light incident thereon over a solid angle materially greater than 2π steradians but less than 4π steradians; a light-responsive element mounted on said housing and disposed inwardly of the first-named element and responsive to light incident on said first-named element from all directions within said solid angle; indicating means carried by said housing and associated with said light-responsive element for producing a visible indication of the quantity of light so incident upon said first-named element; cover means secured to said housing and movable between positions respectively exposing said first-named element substantially completely to all available light to which it is receptive and enclosing the same, said cover means being provided with side wall portions adapted to enclose the lateral sides of said first-named element, and a forward wall portion, positioned adjacent but outwardly removed from said first-named element when in said last-mentioned position, said forward wall portion being provided with an aperture of substantially the same lateral dimensions as said first-named element and adapted to restrict the angle of incidence of light falling thereon to a value less than 2π steradians.

6. An exposure meter which comprises: a translucent and diffusing light-receiving element having an outer light-receiving surface of substantially hemispherical configuration adapted to receive light from directions within a solid angle materially greater than 2π steradians; a light-responsive element disposed inwardly of the first-named element and responsive to the diffused light transmitted thereto by said light-receiving element and resulting from light incident upon said surface from all directions within said solid angle; and indicating means associated with said light-responsive element for producing a visible indication of the quantity of light received by said surface.

DONALD W. NORWOOD.

Certificate of Correction

Patent No. 2,214,283.  September 10, 1940.

DONALD W. NORWOOD

It is hereby certified that errors appear in the printed specification of the above numbered patent requiring correction as follows: Page 2, first column, line 20, for "cresent" read *crescent;* page 3, second column, line 52, for "dosposed" read *disposed;* page 4, first column, line 4, before "$r$" insert the numeral *2;* line 51, claim 2, strike out "a light-responsive"; line 61, claim 3, before "translucent" insert *a;* and that the said Letters Patent should be read with these corrections therein that the same may conform to the record of the case in the Patent Office.

Signed and sealed this 29th day of October, A. D. 1940.

[SEAL]

HENRY VAN ARSDALE,

*Acting Commissioner of Patents.*